(12) United States Patent
Hinatsu et al.

(10) Patent No.: US 8,617,361 B2
(45) Date of Patent: *Dec. 31, 2013

(54) PEM WATER ELECTROLYSER MODULE

(75) Inventors: James T. Hinatsu, Mississauga (CA); Michael C. Stemp, Toronto (CA)

(73) Assignee: Next Hydrogen Corporation (CA)

( * ) Notice: Subject to any disclaimer, the term of this patent is extended or adjusted under 35 U.S.C. 154(b) by 583 days.

This patent is subject to a terminal disclaimer.

(21) Appl. No.: 12/849,441

(22) Filed: Aug. 3, 2010

(65) Prior Publication Data

US 2011/0042228 A1 Feb. 24, 2011

Related U.S. Application Data

(60) Provisional application No. 61/272,126, filed on Aug. 19, 2009.

(51) Int. Cl.
*C25B 1/10* (2006.01)
(52) U.S. Cl.
USPC .......................... 204/256; 205/628
(58) Field of Classification Search
USPC .......................... 204/256; 205/628
See application file for complete search history.

(56) References Cited

U.S. PATENT DOCUMENTS

| | | | |
|---|---|---|---|
| 4,204,939 | A | 5/1980 | Boulton et al. |
| 4,465,570 | A | 8/1984 | Oda et al. |
| 2007/0026283 | A1 | 2/2007 | LaConti et al. |
| 2007/0215492 | A1 | 9/2007 | Vandenborre |
| 2010/0012503 | A1 | 1/2010 | Hinatsu et al. |

FOREIGN PATENT DOCUMENTS

| | | |
|---|---|---|
| JP | 57-094579 | 6/1982 |
| WO | 95-28510 | 10/1995 |
| WO | 95/28510 | 10/1995 |
| WO | 98/32900 | 7/1998 |
| WO | 98-32900 | 7/1998 |
| WO | 2006-060912 | 6/2006 |
| WO | 2006/060912 | 6/2006 |
| WO | 2010/006423 | 1/2010 |

OTHER PUBLICATIONS

F. Vitse, M. Cooper and G.G. Botte, on the use of ammonia electrolysis for hydrogen production, J. Power Sources 142, (2005) 18.
M. Kondoh, et al., "Development of solid polymer-electrolyte water electrolyser" Journal of New Materials for Electrochemical Systems 3 (2000) pp. 61-65.
S. Stucki, et al. "PEM water electrolysers; evidence for membrane failure in 100kW demonstration plants", Journal of Applied Electrochemistry 28 (1998) 1041-1049.
Written Opinion of the International Searching Authority, PCT/CA2010/001161, pp. 1-7, (Nov. 10, 2010), and Transmittal of The International Search Report for PCT/CA2010/001161, pp. 1-5 (Nov. 10, 2010).

*Primary Examiner* — Nicholas A Smith
(74) *Attorney, Agent, or Firm* — Harness, Dickey & Pierce, P.L.C.

(57) ABSTRACT

A PEM water electrolyser module comprising a plurality of structural plates each having a sidewall extending between opposite end faces with a half cell chamber opening, at least one oxygen degassing chamber opening, and at least one hydrogen gas collection manifold opening, extending through the structural plate between opposite end faces. The structural plates are arranged in face to face juxtaposition between opposite end plates.

8 Claims, 7 Drawing Sheets

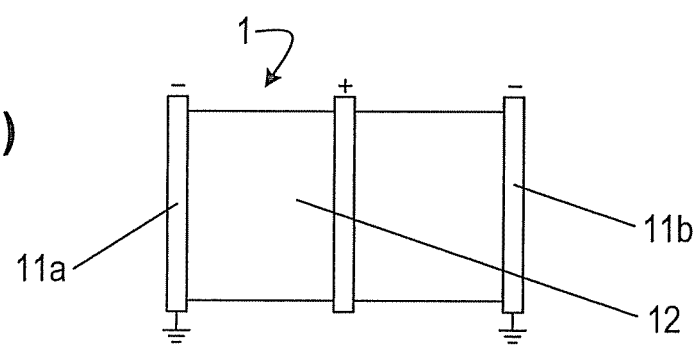
FIG. 4(iii)

PEM WATER ELECTROLYSER MODULE

FIELD OF THE INVENTION

The present invention relates to the design of polymer electrolyte membrane (PEM) water electrolysers for the production of hydrogen and oxygen gases, and more particularly, to a PEM water electrolyser module and components therefor.

BACKGROUND OF THE INVENTION

Electrolysers use electricity to transform reactant chemicals to desired product chemicals through electrochemical reactions, i.e., reactions that occur at electrodes that are in contact with an electrolyte. Hydrogen is a product chemical of increasing demand for use in chemical processes, and also potentially for use in hydrogen vehicles powered by hydrogen fuel cell engines or hydrogen internal combustion engines (or hybrid hydrogen vehicles, also partially powered by batteries). Electrolysers that can produce hydrogen include: water electrolysers, which produce hydrogen and oxygen from water and electricity; ammonia electrolysers, which produce hydrogen and nitrogen from ammonia and electricity; and, chlor-alkali electrolysers, which produce hydrogen, chlorine and caustic solution from brine and electricity.

Water electrolysers are the most common type of electrolyser used for production of gaseous hydrogen as the main product of electrolysis. Polymer electrolyte membrane (PEM) water electrolysers are coming into more common commercial use, at least at a small scale. PEM water electrolysers use polymer electrolyte membranes, typically with appropriately catalyzed electrodes deposited on either side to form membrane-electrode assemblies (MEA). Hydrogen is produced at the cathodes (negative electrodes), and oxygen is produced at the anodes (positive electrodes) upon passage of current between the electrodes. The rates of production of hydrogen and oxygen are proportional to the current flow in the absence of parasitic reactions for a given physical size of electrolyser. The most common type of polymer electrolyte membrane is proton exchange membranes, for which the reactions are as shown in equations (1)-(3):
Cathode:

$$2H^+ + 2e^- \rightarrow H_2 \quad (1)$$

Anode:

$$H_2O \rightarrow \tfrac{1}{2}O_2 + 2H^+ + 2e^- \quad (2)$$

Cell:

$$H_2O \rightarrow H_2 + \tfrac{1}{2}O_2 \quad (3)$$

The electrolyte consists of the hydrated proton exchange membranes, which are ionically (proton) conducting through migration of protons between ion exchange sites under a voltage gradient. The solid membranes also serve to maintain the hydrogen and oxygen gases separate and of high purity.

The scale of PEM water electrolysers has generally been limited to about 10 Nm³/h or less in commercial applications, even with multiple cell stacks. In general, PEM water electrolyser cell stacks remain limited in active cell area and the number of cells per cell stack. There have been only limited attempts to design and demonstrate scale up of PEM water electrolyser cell stacks.

Stucki et. al [J. Appl. Electrochem., 28 (1998) 1041-1049] reported testing of relatively long cell stacks with 120 cells and an active cell area of 400 cm²; significant durability and lifetime issues were reported. Durability and lifetime of PEM water electrolysers remain as an ongoing challenge, even with small sized cell stacks, particularly as relates to durability and lifetime of proton exchange membranes. The challenge tends to scale with the size/capacity of the cell stack, and is exacerbated by the trend toward use of thinner membranes to improve cell polarization performance. Hypothesized membrane failure modes include: (i) localized "hot spots", due to high local current densities and/or insufficient cooling; (ii) mechanical stress on membranes due to operation with differential pressure across the membranes, leading to membrane creep, especially at typical target elevated operating temperatures of 80-90° C.; and, (iii) chemical attack on perfluorocarbon backbones of membranes by peroxide reaction intermediates. Approaches to addressing (iii) include the advent of "chemically stabilized" perfluorosulfonic acid membranes, and the development of membranes with backbone structures with improved chemically stability, such as polysulfone-like structures, e.g., US 20080275146. The common approach to addressing (i) and (ii) is through "support member" or "compression member" designs, e.g., U.S. Pat. No. 6,500,319, U.S. Pat. No. 6,855,450, U.S. Pat. No. 7,217,472, and US 20090114531. New approaches to cell design in general could further address (i) and (ii), in particular addressing requirements for operation with significant differential pressure across the membranes as well sufficiency and uniformity of cooling to all cells, especially in large cell stacks.

Scale up to not only large numbers of cells, but also larger active cell areas is required to meet the requirements of both current and potential emerging large scale industrial applications of hydrogen. Kondoh et. al. [J. New Mat. Electrochem. Systems 3 (2000) 61-65] reported limited testing of a PEM water electrolyser cell stack with a larger active cell area of 2,500 cm², but only 10 cells; the feasibility of scale-up to the target of 300 cells remains unknown. Clearly, a design amenable to larger active cell area that also is inherently scalable with regard to the number of cells per cell stack would be advantageous.

As used herein, the terms "half cell", "half electrolysis cell" and equivalent variations thereof refer to a structure comprising one electrode and its corresponding half cell chamber that provides space for gas, or gas-liquid (water) flow out of the half cell. The term "cathode half cell" refers to a half cell containing a cathode, and the term "anode half cell" refers to a half cell containing an anode.

As used herein, the terms "cell", "electrolysis cell" and equivalent variations thereof refer to a structure comprising a cathode half cell and an anode half cell. A cell also includes a membrane, typically located between, and integral with, the cathodes and anodes. A membrane therefore defines one side of each half cell. The other side of each half cell is defined by an electronically conducting solid plate, typically comprised of metal, carbon, carbon-polymer composite, or combinations thereof, and generally known as a bipolar plate. The functionality of the bipolar plate is to maintain the fluids in adjacent half cell chambers of adjacent cells separate, while conducting current electronically between adjacent cells. Each half cell chamber also contains an electronically conducting component generally known as a current collector or current carrier, to conduct current across the half cell chamber, between the electrode and the bipolar plate.

Practical PEM water electrolysers utilize a structure comprising multiple cells, generally referred to as a "cell stack", in which the cells typically are electrically connected in series. A cell stack typically consists of multiple cells, with bipolar plates physically separating but electrically connecting adjacent cells. One approach to cell stack construction is to use structural plates or "frames" to form the cell stack body, e.g., as exemplified in U.S. Pat. No. 6,500,319. As used herein, the term "structural plate" refers to a body which defines at least one half cell chamber opening. A cell stack typically is constructed using a series of structural plates to define alternately cathode and anode half cell chambers for fluid (gas, or gas-liquid mixtures and liquid) flow. The structural plates also hold functional components, which may include, for example, MEA's, electrode backing layers (separate, or as part of the MEA's), current collectors, and bipolar plates, in their appropriate spatial positions and arrangement. The series of structural plates and functional components typically constitutes a filter press type structure, including end pressure plates. In an alternative approach to cell stack construction, the structural plate, current collector and bipolar plate functionality can be combined in the bipolar plates, in which case, the bipolar plates further comprise stamped, machined or molded grooves or passages for fluid flow.

The cathode half cell chambers can be operated "dry" or "wet": in the former case the cathode half cell chambers contain substantially only hydrogen gas (saturated with water vapour, and with any condensed water) during operation; in the latter case the chamber contains a gas-liquid mixture (hydrogen-water) during operation. The anode half cell chambers typically are operated "wet" (in order to supply feed water to the anodes), and contain a gas-liquid mixture (oxygen-water) during operation. The gas or gas-liquid mixture(s) typically are collected into manifolds at the exits of the half cell chambers. The gas-liquid mixtures must be treated in degassing vessels, which serve to separate the respective gases from the entrained electrolyte. The terms "electrolyser module" or "electrolyser" as used herein refer to a structure comprised of an electrolyser cell stack and its associated degassing vessels or chambers.

Most practical PEM water electrolyser modules today utilize "dry" cathode half cell chambers, and "wet" anode half cell chambers. Further, typically the anode side pressure is near-atmospheric, while the cathode side pressure is significantly higher, e.g., at least 100 psig. This type of system and operating approach is simple, low cost and minimizes exposure of circulating water to metallic parts, since water circulates only at low pressure, enabling the use of plastic gas-liquid separation vessels, circulation pumps, and interconnecting piping. This in turn minimizes contamination of the water by metal ions (which would "poison" the proton exchange membranes, reducing their conductivity), and water purification system requirements. However, this operating approach also results in significant differential pressures across the membranes, stress on the membranes, and potential durability and lifetime issues due to creep effects. The maximum differential pressure across the membranes generally is limited to 300 psi (depending on the membrane thickness, reinforcement, and cell configuration); consequently, typical hydrogen side pressures have been limited to significantly less than 300 psi in practice for "stand alone" cell stacks; that is, cell stacks without external pressure supporting structures or vessels. Furthermore, poor durability with thin membranes has been a barrier to practical realization of the excellent cell performance potential of PEM water electrolysers.

If higher hydrogen pressures are desired, then the typical approach is to place the cell stack inside a pressure vessel. The pressure vessel typically is filled with water, and is commonly used as the oxygen gas-liquid separation vessel, allowing for natural fluids circulation, without a mechanical pump, and ease of equalization of pressures outside the cell stack and in the anode half cell chambers, while maintaining flexibility in cathode side operating approach. The hydrogen (cathode) side can be operated dry or wet, and at the same pressure as the oxygen (anode) side or at a different pressure than the oxygen side. Of course, the requirement for a pressure vessel is a disadvantage, especially if PEM water electrolysers with higher gas production capacity are to be considered.

Cooling of the cell stack can be accomplished via cooling plates (plates with internal passages for coolant circulation) interspersed along the length of the cell stack; however, this approach adds complexity and cooling is potentially uneven, increasing the potential for development of hot spots.

Cooling of the cell stack also can be accomplished by cooling the circulating water, for example by a heat exchanger or by cooling elements in the gas-liquid separation vessel(s). Cooling can be expected to be most effective with "wet" cathode half cell chambers. With "dry" cathode half cell chambers, the anode side cooling also is relied on to remove a significant portion of the cathode side heat, but still provides more direct cooling of each and every MEA.

In order to address the shortcomings of known practical electrolyser modules, what is needed is a simple, cost-effective design that minimizes associated mechanical connections and assembly, while addressing the following aspects which have been lacking in known PEM water electrolyser designs: (i) significantly larger scale; (ii) inherent scalability (i.e., freedom to vary the number of cells over a wide range to meet a wide range of gas production capacities, including very high gas production capacity); (iii) simple operation without significant differential pressures across the MEA's, or alternatively, simple operation at higher hydrogen side pressure, without using an external pressure vessel or external structural supports; and, (iv) uniform and self-adjusting cooling of each and every cell in the electrolyser. Such a design, especially when further designed to provide a wide range of gas production capacity per cell, would be especially useful when connected to a source of electricity with variable output power, for example, a wind farm or a solar array.

SUMMARY OF THE INVENTION

A PEM water electrolyser module comprising a plurality of structural plates each having a sidewall extending between opposite end faces with a half cell chamber opening, at least one oxygen degassing chamber opening, and at least one hydrogen gas collection manifold opening, extending through the structural plate between the opposite end faces. The structural plates are arranged in face to face juxtaposition between opposite end plates.

Each half cell chamber opening at least partially houses electrolytic half cell components comprising at least an MEA, and a bipolar plate in electrical communication with the MEA. The structural plates and half cell components define an array of series connected electrolytic cells surmounted by at least one oxygen degassing chamber and at least one hydrogen gas collection manifold. The structural plates define, at least when in said face to face juxtaposition, respective gas-liquid passages extending between a top part of the anode half cell chambers and a bottom part of at least one of said at least one oxygen degassing chamber to provide fluid communication between the anode half cell chambers and said at least one of said at least one oxygen degassing chamber. The structural plates further define, at least when in face to face juxtaposition, discrete degassed liquid passages extending between a bottom part of at least one of said at least one oxygen degassing chamber and a bottom part of said anode half cell chambers for degassed liquid return from at least one of said at least one oxygen degassing chamber to said anode half cell chambers. The structural plates also further define, at least when in face to face juxtaposition hydrogen gas passages extending between a top part of the cathode half cell chambers and at least one of said at least one gas collection manifold. The PEM water electrolyser module further comprises respective oxygen gas discharge and feed water passages extending therethrough and fluidly communicating with at least one of the one or more degassing chambers for oxygen gas discharge from said at least one oxygen degassing chamber and for feed water introduction into the degassing chamber; and hydrogen gas passages extending therethrough for hydrogen gas discharge from said at least one hydrogen gas collection manifold.

DESCRIPTION OF DRAWINGS

Preferred embodiments of the present invention are described below with reference to the accompanying illustrations in which.

DESCRIPTION OF PREFERRED EMBODIMENTS

Figure 1:
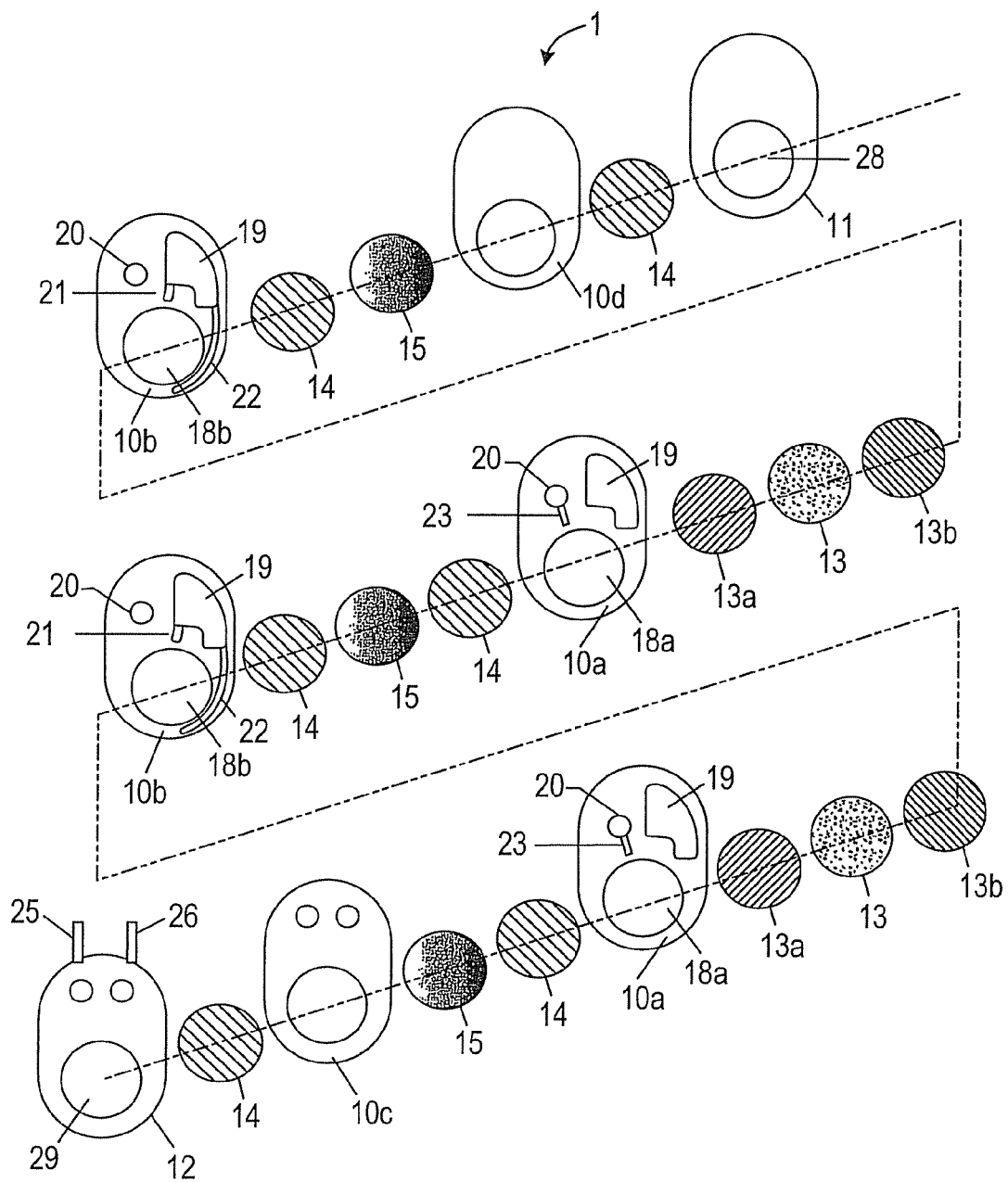
FIG. 1 is an assembly view of about half of an electrolyser module in accordance with the present invention.
Figure 1A:
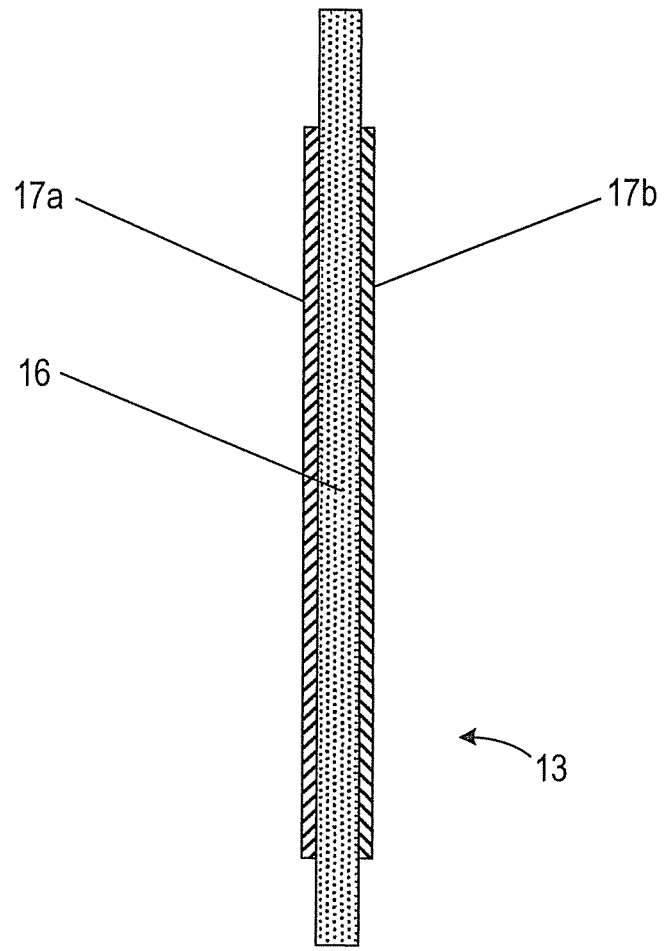
FIG. 1a is a side cross-sectional view of a MEA.

An electrolyser module in accordance with an aspect of the present invention is shown generally at 1 in FIG. 1. FIG. 1 shows about half of an electrolyser module with 4 cells for illustrative purposes only; the other half of the electrolyser module would be a mirror image (on either side of feature 12, which in this case represents the midpoint of the electrolyser module). In practice, typically greater numbers of cells would be incorporated. Electrolyser module 1 includes structural plates 10, end pressure plates 11, intermediate pressure plate 12, MEA's 13, electrode backing layers 13a and 13b, current carriers 14 and bipolar plates 15. A typical MEA shown generally at 13 in FIG. 1a, consists of a membrane 16, a cathode 17a coated onto one side of the membrane, and an anode 17b coated onto the other side of the membrane. In some embodiments, the electrode backing layers also can be incorporated into the MEA. Further, as is known in the art, internally-reinforced membranes can be used, or the MEA's can be externally reinforced to improve their mechanical stability. In the embodiment shown in FIG. 1, there are two main types of structural plates 10: cathode structural plates 10a and anode structural plates 10b. Additional special structural plates 10c and 10d can be located adjacent to the intermediate pressure plate 12 and the end pressure plates 11, respectively, for example, to help accommodate cooling tube or cooling coil assemblies. Suitable sealing gaskets (not shown) also are understood to be included. Electrolyser module 1 thus comprises a plurality of electrolysis cells 18 and associated oxygen degassing chambers 19 and hydrogen gas collection manifolds 20. The electrolysis cells 18 preferably are located at the bottom part of the electrolyser module 1, and the associated oxygen degassing chambers 19 and hydrogen gas collection manifolds 20 preferably are located at the top part of the electrolyser module 1, surmounting the electrolysis cells 18. The electrolysis cells comprise cathode and anode half cell chambers 18a and 18b defined by two adjacent structural plates, as well as a MEA 13, electrode backing layers 13a and 13b, and the current collectors 14. Bipolar plates 15 physically separate and electrically connect adjacent cells.

Figure 2:
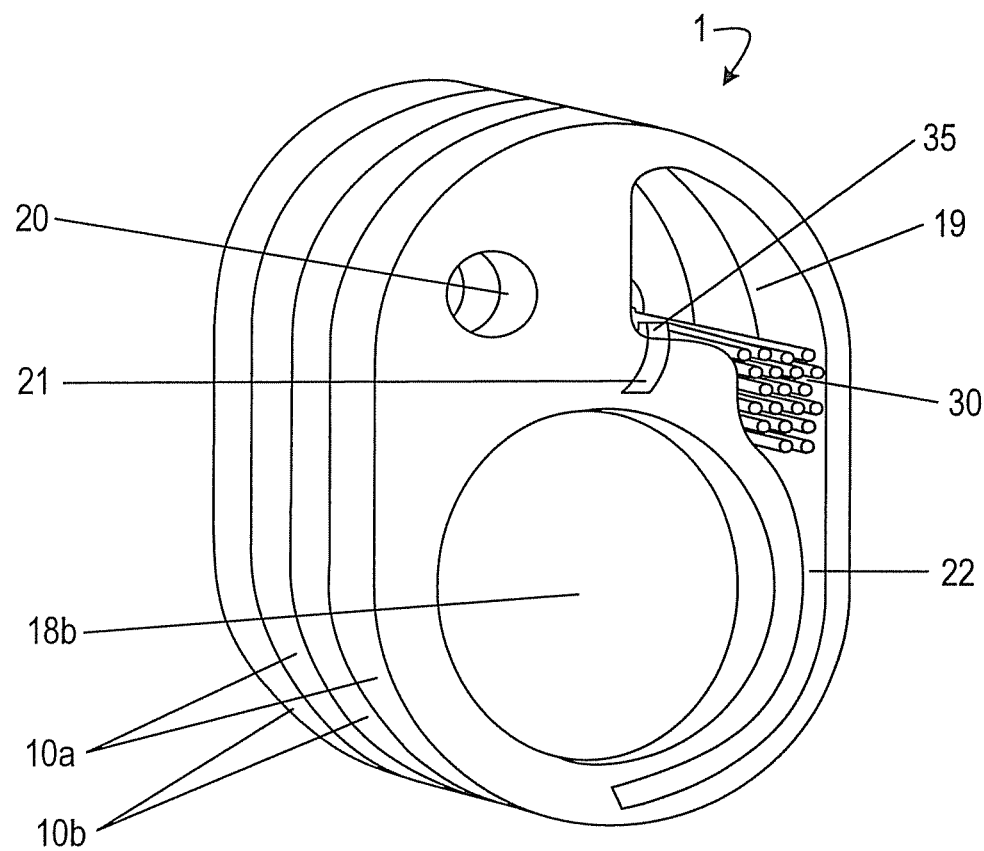
FIG. 2 shows further detail of the degassing chamber part of an electrolyser module in accordance with the present invention.
Figure 3:
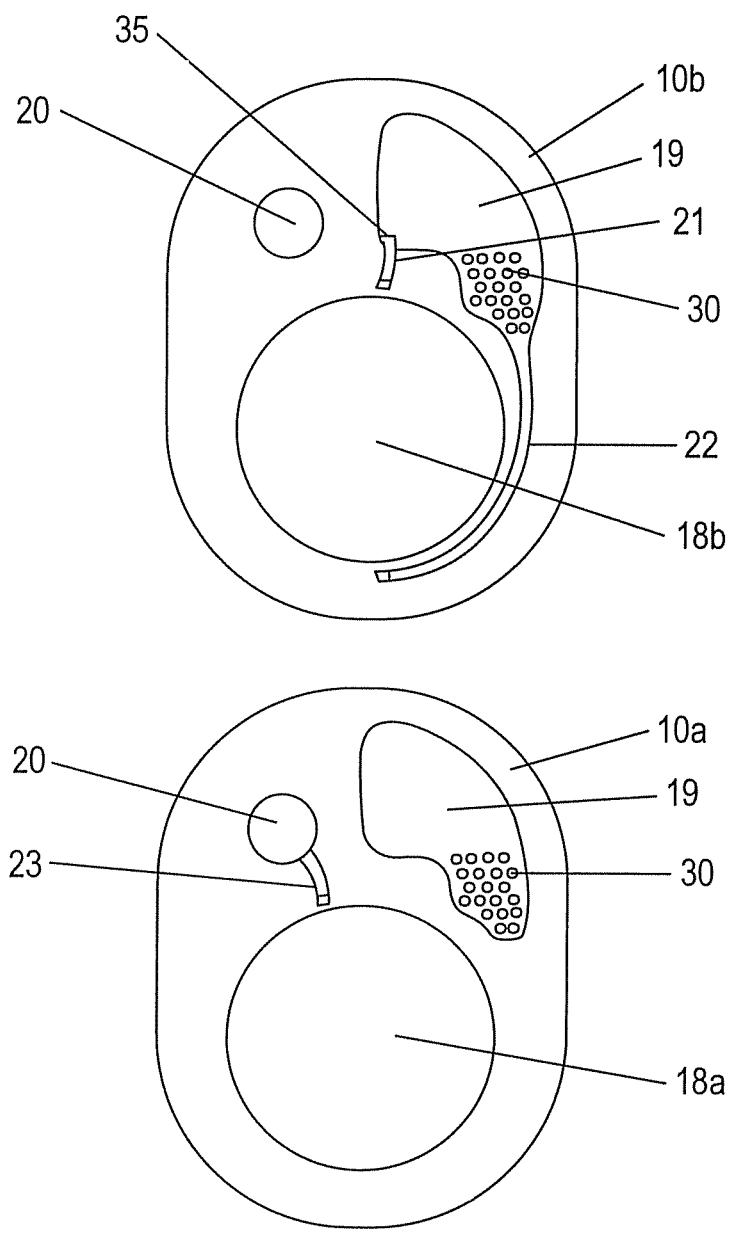
FIG. 3 shows the front face of an embodiment of a structural plate in accordance with the present invention.

As shown in FIGS. 1-3, each anode half cell chamber 18b is directly connected to the oxygen degassing chamber 19 by a gas-liquid passage 21, and a degassed liquid passage 22. Similarly, each cathode half cell chamber 18a is directly connected to the hydrogen gas collection manifold 20 by a hydrogen gas passage 23. Consequently, the internal fluid flow requirements for PEM water electrolyser module 1 are provided for by the features of each half cell, rather than by circulation features extending across all the cells or a large number of cells, such as gas-liquid manifolds and degassed liquid manifolds, which present an increasing pressure drop as their length is increased. Electrolyser module 1 thus is an inherently scalable structure, in that not only the number of cells and the size of the degassing chambers, but also the fluid circulation capabilities, automatically scale with the number of cells in the electrolyser module. Furthermore, electrolyser module 1 does not require a mechanical electrolyte pump(s) to facilitate circulation of fluids between the anode half cell chambers and the oxygen degassing chambers; the fluid flows are driven by gas buoyancy and gravity head, and thus are self-regulating in that they automatically vary with the gas production rates. (Commercial PEM water electrolyser modules utilize mechanical electrolyte pumps to facilitate circulation of fluids (liquid water and liquid water-oxygen gas mixtures) inside the electrolyser module and between the electrolyser module and an external degassing (gas-liquid separation) vessel.)

The cell portion of the PEM water electrolyser module assembly can generally be as is known in the art. The boundaries of each cell are defined by bipolar plates 15, which are solid plates made of one or more suitably conductive and corrosion-resistant materials such as platinum-plated metal, carbon, or carbon-filled polymer, to provide electronic conduction of electricity between adjacent cells. Electrical connection between bipolar plates 15 and each of the cathode 17a and the anode 17b in a given cell may be accomplished with suitable electronically conducting porous current carriers 14, and electrode backing layers 13a and 13b, which allow for even current carrying and distribution across the faces of the electrodes 17a, 17b and bipolar plates 15, as well as relatively unimpeded fluid flow through the half cell chambers 20. Examples of suitable materials and configurations for current collectors are known in the art, including multiple metal screens, woven metal layers, porous carbon layers, metal or carbon foam, or polymer filled with a conductive material such as metal or carbon. In some embodiments, the bipolar plates 15 can be dimpled, corrugated, etc., and thereby can provide direct connection between the cathodes 17a and anodes 17b without using separate current carriers 14; typically a series of flow passages or a "flow field" is formed. The membranes 16 typically form an integral MEA 13 with the respective adjacent cathodes 17a and anodes 17b. The membranes 16 thus lie essentially in the middle of the electrolysis cells 18, and separate the respective cathode and anode half cells 18a and 18b. The membranes 16 may be non-porous ion exchange membranes such as NAFION™. The MEA's 13 may be as known in the art, with electrodes comprised of noble-metal catalysts or noble-metal catalyzed high surface area carbon and deposited directly onto the membranes 13. In the case of, e.g., hydroxyl ion conducting membranes, lower cost base metal catalysts may be used. Electrical current is supplied to the cell portion of electrolyser module 1 by, for example, a DC power supply, via electrical connections to end pressure plates 11 and optionally intermediate pressure plate 12.

During operation of the PEM water electrolyser module 1, hydrogen gas is evolved at the cathodes 17a and is released into the cathode half cell chambers 18a, and then travels to the hydrogen gas collection manifold 20 through the discrete hydrogen gas passages 23. Similarly, during operation, oxygen gas is evolved at the anodes 17b and is released into the anode half cell chambers 18b, where it forms oxygen gas-liquid water mixtures that rise and travel to the oxygen degassing chamber 19 through discrete gas-liquid passages 21. The liquid water is separated from the oxygen gas in the degassing chamber, and degassed liquid returns to the anode half cell chambers 18b through discrete degassed liquid passages 22. Separated hydrogen gas exits through hydrogen gas outlet 25, which is connected to hydrogen gas collection manifold 20; separated oxygen gas exits through separated oxygen gas outlet 26 in the oxygen degassing chamber. Features 25 and 26 typically are located in the intermediate pressure plate 12, or in one or both of the end pressure plates 11.

Further detail of an oxygen degassing chamber in the electrolyser module assembly according to the current invention is shown in FIG. 2. Only a section of the oxygen degassing chamber 19 (corresponding to a few structural plates 10) is shown in FIG. 2, which is for illustrative purposes only. It is to be understood that the use of more than one oxygen degassing chamber can be contemplated. The degassing chamber volume is defined by the series of adjacent degassing chamber openings in the plurality of structural plates 10. Cooling coils or cooling tubes 30 for cooling the incoming gas-liquid mixtures as may be required are located in the lower section of the degassing chambers 19. The electrolyser module 1 includes respective oxygen gas discharge and feed water passages extending therethrough and fluidly communicating with the degassing chamber 19 for gas discharge from the degassing chamber and for feed water introduction into the degassing chamber. Water addition means (not shown) add water through the feed water passages as required to the degassing chamber 19. Thus, the degassing chamber 19 has multiple functions: firstly, to separate the incoming oxygen gas-liquid water mixtures into separated oxygen gas and separated liquid water; also, to cool the fluids as may be required, for example to maintain appropriate cell operating temperatures; and further, to provide a volume for addition of make-up feed water (replacing that consumed in the water electrolysis reaction). During operation of the electrolyser module 1, the gas-liquid mixture from the corresponding anode half cell chambers enters the oxygen degassing chamber 19 from gas-liquid passages 21. Although only one gas-liquid passage per anode half cell is shown, it is understood that a plurality of gas-liquid passages per half cell may be used. The gas portion of the incoming gas-liquid mixture rises in the degassing chamber volume, and is thereby separated from the liquid portion of the incoming gas-liquid mixture. Means for promoting gas-liquid separation, such as baffles, also can be used to promote gas-liquid separation in a given degassing chamber volume. The separated and partially cooled gas is removed from the degassing chamber 19 in the PEM water electrolyser module 1 via at least one separated gas discharge outlet 25 at one or more suitable locations near the top of the degassing chamber 19. The separated and cooled liquid is returned to the anode half cell chambers via the corresponding degassed liquid passages 22, thereby effectively and evenly cooling each and every individual cell. Notably, the amount of cooling is self-adjusting, since more or less water is circulated through the anode half cell chambers at higher or lower operating currents. Although only one degassed liquid passage per anode half cell is shown, it is to be understood that a plurality of degassed liquid passages per anode half cell may be used.

In the embodiment illustrated in FIG. 2, flow directing means 35 are added to direct the incoming gas-liquid mixture from the gas-liquid passages along the length of the degassing chamber. Benefits of this configuration include: (i) avoidance of disturbance of the gas layers at the top of degassing chamber 19 by incoming gas-liquid mixtures, and improved gas-liquid separation efficiency; (ii) improved heat transfer coefficients for the cooling coils or cooling tubes in degassing chamber 19; and, (iii) avoidance of excessive gas carry under back to the half cells. These benefits are accrued while maintaining good fluid flow across the width of degassing chamber 19, since the points of connection of gas-liquid passages 21 and degassed liquid passages 22 are on opposite sides of degassing chamber 19. Fluid flow modeling indicates that without any flow directing means, there is very little flow along the length of degassing chamber 19. The flow directing means 35 as shown comprises a "hood" over the point of entry of gas-liquid mixture into degassing chamber 19, consisting of at least one and up to three "walls" and a "roof", with the opening to the degassing chamber corresponding to the intended direction of fluid flow. The "walls" and "roof" may be angled or otherwise oriented as may be appropriate to obtain desired fluid flow patterns. While the "hood" structure is relatively easily manufactured and presents relatively little resistance to fluid flow, it is to be understood that other flow directing means can be used, for example, a bent tube extending from the gas-liquid passage into the degassing chamber 19.

The electrolyser module corresponding to the embodiment illustrated in FIG. 2 is inherently highly scalable, since the same general fluid flow patterns can be expected over a wide range of the number of cells in the module, and the degassing chamber volume and degassing capacity scale automatically with the number of cells, or more particularly, with the number of structural plates in the electrolyser module. Furthermore, the cooling capacity of the module also is scalable with the number of cells in the electrolyser module by adding cooling coil or tube length proportionally, and also optionally varying the coolant flow rate. Scale does not affect the uniformity of cooling of the individual cells in electrolyser module 1.

Structural plates for an electrolyser module according to the current invention are shown in FIG. 3. FIG. 3 shows a preferred embodiment in which each structural plate 10a or 10b defines a half cell chamber opening 18a or 18b, a hydrogen gas collection manifold opening 20, and an oxygen degassing chamber opening 19; it is understood that each structural plate can define more than one of each type of opening. Structural plates associated with cathode half cells are called cathode structural plates 10a, and structural plates associated with anode half cells are called anode structural plates 10b. Each cathode structural plate 10a also comprises one or more hydrogen gas passages 23, which directly connect the top part of the half cell chamber opening 18a to the hydrogen gas collection manifold opening 20. Each anode structural plate 10b also comprises one or more gas-liquid passages 21, which directly connect the top part of the half cell chamber opening 18b to the degassing chamber opening 19. Each anode structural plate 10b further comprises one or more degassed liquid passages 22, which directly connect the bottom part of the half cell chamber opening 18b to the degassing chamber opening 19. Although only one gas-liquid passage 21 and one degassed liquid passage 22 are shown in FIG. 3, it is to be understood that a plurality of each type of passage can also be used.

The degassing chamber opening 19 in the anode structural plates 10b may be considered to have an upper section and a lower section. Separated gas rises into the upper section and degassed liquid descends into the lower section. The discharge opening of the gas-liquid passage 21 is preferably located to avoid introducing gas into the degassed liquid and liquid into the gas. Accordingly the gas-liquid passages 21 enter the degassing chamber 19 at a location that is not below the entrance to the degassed liquid passages 22 which is in the lower (preferably lowest) region of the upper section of the degassing chamber openings 19 to maximize gas-liquid separation volume. Further, the entrances to the gas-liquid passages 21 and the degassed liquid passages 22 are on opposite sides of the degassing chamber.

The anode structural plates 10b further comprise a fluid flow directing means 35 at the point of connection of the gas-liquid passage 21 to degassing chamber opening 19. In this embodiment, fluid flow directing means 35 comprises a "hood" over the point of connection of the gas-liquid passage 21 to the degassing chamber opening 19. The "hood" consists of at least one and up to three "walls" and a "roof", with an opening corresponding to the intended directions of fluid flow. While the "hood" structure is relatively easily manufactured, presents relatively little resistance to fluid flow, and does not adversely affect the structural integrity of the surrounding areas, it is to be understood that other fluid flow directing means can be used.

Different structures can be contemplated for the passages for gas-liquid transfer 21 and the degassed liquid passages 22 including; (i) surface channels, i.e., channels defined in the surface of structural plate 10; (ii) internal passages, i.e., passages defined in the interior of structural plate 10; (iii) surface channels that become internal passages in certain sections; and, (iv) internal passages that become surface channels in certain sections. In FIG. 3, the passages are shown as comprising surface passages, except near the points of connection to the half cell chamber opening 18, where the surface passages become internal passages in order to allow for passage under sealing gasket holding features. This approach aids in manufacturability; for large parts, as required to achieve high gas production capacities, the use of structures (i) and (iii) above (surface passages and/or surface passages that become internal passages in certain sections) is preferred and likely is required for manufacturability. It is to be understood that in principle, any of the four different passage structures contemplated can be used for any given passage, and combinations of the different approaches for the passages can be used in any given structural plate. It also is to be understood that in the case of surface passages, the passages can be formed in one or both opposing surfaces of adjacent structural plates.

The lengths and cross-sectional areas of the gas-liquid passages 21 and of the degassed liquid passages 22 also are key determinants of fluid flow rates and void fractions (indicative of the extent of gas hold up) in the electrolyser module. Restriction of fluid flows is of course undesirable, and sufficient liquid circulation is required in the electrolyser module, for example, to maintain low void fractions and good heat transfer characteristics. However, the sizes of flow passages are of course limited by the need for supporting structural material and strength, especially for operation at elevated pressures, as well as the desirability of limited thickness of parts such as current carriers 14.

In the current embodiment, the passage cross sectional areas are enlarged by using a "slot" geometry; i.e., although the passage dimension corresponding to the thickness of the structural plate is limited, a slot geometry that is elongated in the perpendicular direction of the same surface can be used to provide a significant cross sectional area, which in turn allows for good fluid flow and circulation in the electrolyser module.

The structural plates 10 preferably are made of a suitable electrically insulating material that is inert to water or moisture and gases (e.g., oxygen, hydrogen, nitrogen, or chlorine), as well as other potential materials to which it may be exposed. Examples of suitable materials include polymeric materials such as polyphenylene oxide (PPO), polyphenylene sulphide (PPS) and the like, and in particular polysulfone, and ceramic materials such as silicon carbide. The plates may be manufactured by conventional molding techniques, such as injection molding or casting, or by conventional machining techniques, such as milling and drilling. Manufacturing by molding techniques enables consideration of reduction of material in the structural plates 10 through inclusion of additional openings, coring, or the like (for moldability, weight, cost, and potential strain relief considerations), as well as the use of complex shapes for the body, the half cell chamber openings, the hydrogen gas collection manifold openings, the hydrogen gas passages, the degassing chamber openings, the gas-liquid passages, and the degassed liquid passages. Furthermore, given potential limitations in the sizes of parts that can be manufactured, forming of structural plates in multiple portions that can be interconnected or joined to form a complete structural plate also is contemplated.

The structural plates further comprise first and second opposing surfaces which define holding features for locating and holding functional cell components, including MEA's 13 and bipolar plates 15. These holding features enable proper location and alignment of functional components in an assembled electrolyser module. For example, each holding feature for a given functional component may comprise an "L" shaped seat, which surrounds the corresponding half cell chamber opening. Each "L" shaped seat comprises a seat back and a seat wall, which preferably are orthogonal to one another. Each "L" shaped seat faces inward toward the half cell chamber opening. The functional components are sized to "sit" fully in the seats, such that one planar surface of the electrode, membrane or bipolar plate is generally in the same plane as the surface of the structural plate in which it is supported.

The structural plates further comprise first and second opposing surfaces which define holding features for locating and holding sealing gaskets. The seals may be as is known in the art to prevent leakage of gas, liquid, or gas-liquid mixtures (a) from inside the electrolyser module to the outside; and, (b) from inside the chambers or passages in which they are contained. Such seals may include, but are not limited to, for example flat gaskets or preferably o-rings. In the case of flat gaskets, other features such as ribs may be added to one or more of the opposing surfaces. For some features, especially where sealing is not critical, interlocking features or crush ribs, without sealing gaskets, may also be used. Typically, the main holding features for locating and holding sealing gaskets are firstly those surrounding all or at least part of the degassing chamber opening, the hydrogen gas collection manifold opening, those surrounding the half cell chamber opening, and also the main exterior seals surrounding all the fluid-containing volumes, including all of the degassing chamber opening, the hydrogen gas collection manifold opening, the half cell chamber opening, the one or more hydrogen gas passages, the one or more gas-liquid passages and the one or more degassed liquid passages. The use of multiple seals and holding features for locating and holding sealing gaskets also can be contemplated.

When structural plates 10 are arranged together to form the electrolyser module 1 in the embodiment of FIG. 1, the first surface of one structural plate is aligned with the second surface of the adjacent structural plate such that the functional components and sealing gaskets are aligned with their respective holding features, in order that MEA's 13 and bipolar plates 15 are supported by their respective structural plates, and the half cell chambers, degassing chambers, and the perimeter of the electrolyser module are sufficiently sealed.

The sizing of the structural plates 10 in the embodiment of FIG. 3 depends on the required sizes and shapes of the half cell chamber opening, degassing chamber openings, and to some extent, on the required sizes and paths of the gas-liquid passages and the degassed liquid passages. The half cell chamber opening is sized according to the required or appropriate active electrode area for a given operating range of current densities and number of cells in the electrolyser module. The sizes, shapes and configurations of the degassing chamber openings and the gas-liquid passages and for degassed liquid passages are then subsequently sized as required to obtain target liquid flow rates, void fractions, and gas-liquid separation efficiency.

Figure 4I:
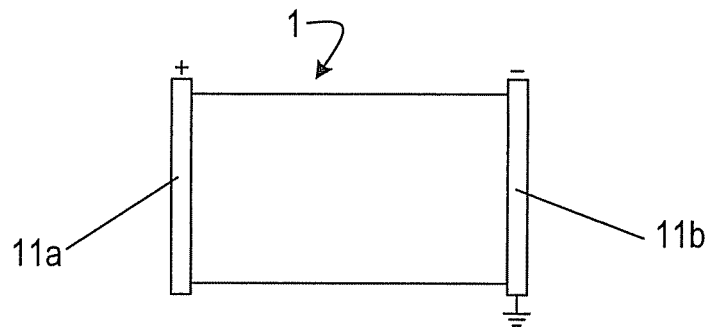
FIGS. 4(i) to 4(vi) show examples of potential electrical connection configurations for an electrolyser module in accordance with the present invention; and, FIG. 5 shows a schematic diagram of an electrolyser system in accordance with the present invention.
Figure 4:
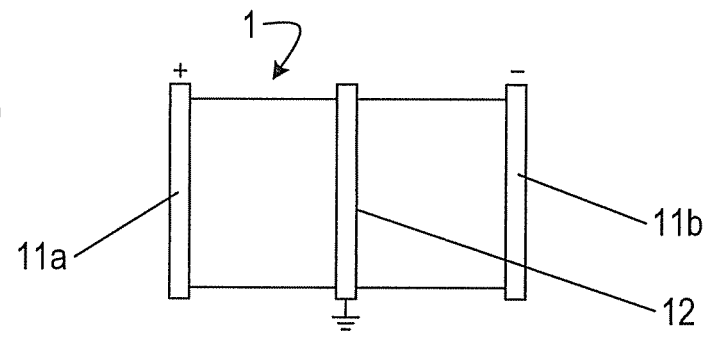
Figure 4:
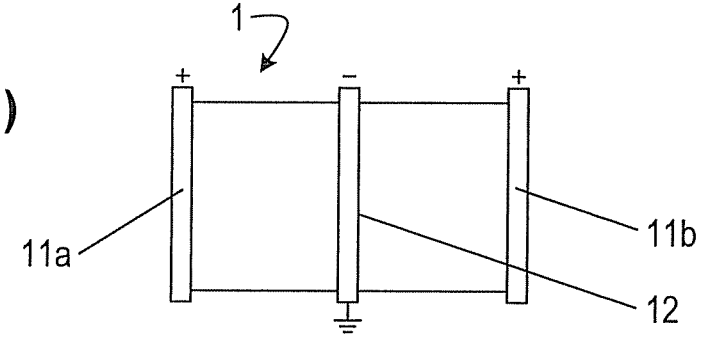
Figure 4V:
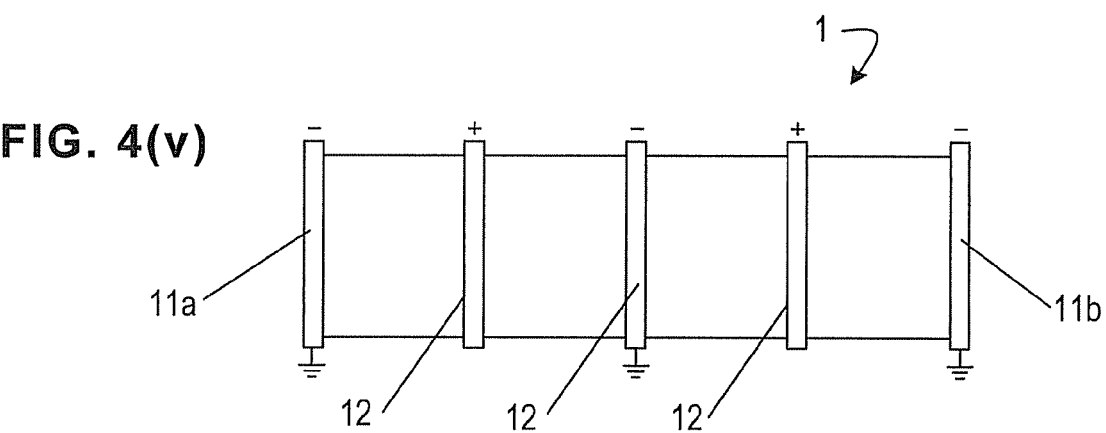
Figure 4:
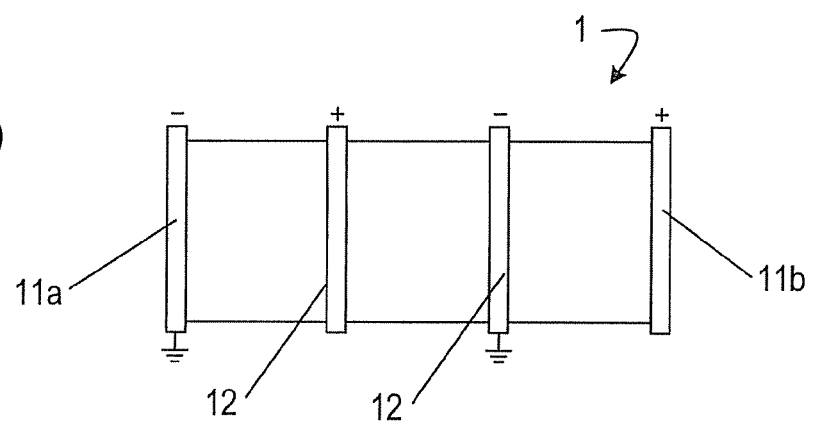

The overall thickness of the structural plate 10 in the embodiments of FIGS. 3 and 4, as measured between its opposing surfaces, may vary depending on the application, part diameter, material(s) of construction, operating pressure, operating temperature, manufacturing method, etc., but must be sufficient to accommodate the gas-liquid passage 21 and degassed liquid passage 22. For example, for PEM water electrolysers, the overall thickness may be up to, e.g., 1.5 cm, and more preferably, 0.8 to 1.5 cm for larger diameter structural plates to be used for higher capacity PEM water electrolysers. Notably, the actual part thickness at any given point in a larger diameter structural plate typically is less than the overall part thickness, due to manufacturability considerations (e.g., for manufacturing by injection molding).

In general, shapes without sharp corners are preferred for the body of structural plate 10, the half cell chamber opening 18, the hydrogen gas collection manifold opening 20, and the degassing chamber opening 19 in the embodiments of FIG. 3, in order to avoid stress concentrations. Specific shapes depend on the design requirements, for example to accommodate different passage paths, to achieve required structural strength, and to accommodate sizes required to achieve good fluid flows and gas-liquid separation, etc. For example, the degassing chamber opening 19 preferably has an irregular shape with rounded corners, but also may have a rectilinear shape with rounded corners or a rounded shape.

A compression system to apply sealing pressure to either end of module through end pressure plates 11, as is well known in the art, also is used. For example, a number of tie rod assemblies using Belleville washer stacks, with the tie rods located either around the outside of the main body of the electrolyser module, and/or going through the body of the electrolyser module, can be used to maintain sealing pressure on the module. The end pressure plates 11 comprise a body and can be made of materials including but not limited to metals or alloys such as titanium, steel, stainless steel, with or without coating or plating, or fibre-reinforced polymers, or combinations thereof. The end pressure plates 11 typically are used to facilitate electrical connection to electrolyser module 1, using appropriate electrical connection means as are known in the art. At least part of the body of the end pressure plates 11, or alternatively, a suitably coated or plated part 28 inserted into the body of the end pressure plates 11, is electrically conducting to facilitate current flow through the portions of the end pressure plates corresponding to the active cell area.

Preferably one or more intermediate pressure plates 12 are also included in the electrolyser module; in the case of one intermediate pressure plate 12, it is preferably located at the midpoint of the electrolyser module (i.e., with an equal number of cells on either side). At least part of the body of the intermediate pressure plate 12, or alternatively, a suitably coated or plated part 29 inserted into the body of the intermediate pressure plate 12, is electrically conducting to facilitate bipolar plate functionality. The intermediate pressure plates 12 (in addition to the end pressure plates 11) also can be used to facilitate electrical connections to PEM water electrolyser module 1. These electrical connections can be current carrying power connections, or non-current carrying connections for grounding purposes only. Depending on the configurations for electrical connections to the PEM water electrolyser module 1, connections for external piping, e.g., for coolant circulation, feed water additions, product gas discharge outlets, inert gas introduction, and drains can be made to the one or more of the end pressure plates 11 and intermediate pressure plates 12. Additional intermediate pressure plates 12 can be included, located so as to divide the total number of electrolysis cells into sections containing equal numbers of cells, depending on the configuration for electrical connections to the PEM water electrolyser module 1.

In the case of very small PEM water electrolyser modules, it may be possible to eliminate the intermediate pressure plates 12. In such a case, only the structural plates 10 would be mounted directly between the end pressure plates 11 and connections for external piping would be made through the end pressure plates 11.

It is not necessary to provide the intermediate plates 12 with gas liquid separator chamber shaped openings. A function of the intermediate plates 12 is to provide a location for withdrawl of gas from the hydrogen gas collection manifold and the oxygen gas liquid separator chambers on either side thereof. This may be achieved with through holes which in effect are "banjo" fittings mounted between opposite sides of the intermediate plates 12. The through holes fluidly communicate with the hydrogen gas collection manifold 20 and the oxygen gas liquid separator chamber 19 on opposite sides thereof and with fluid conduits, e.g., hydrogen gas outlet 25 and oxygen gas outlet 26, extending from the intermediate pressure plate.

The intermediate pressure plates 12 comprise a body that can be made of materials including but not limited to metals or alloys such as titanium, steel, stainless steel, with or without coating or plating, or fibre-reinforced polymers, or combinations thereof.

There are several potential approaches to making electrical power connections to the PEMWE module 1 to pass current through the plurality of electrolytic cells. These approaches can generally be categorized as follows: (a) positive electrical power connection to one of the end pressure plates 11, and negative electrical power connection to the other end pressure plate 11; (b) negative electrical power connection to both end pressure plates 11; and, (c) positive electrical power connection to both end pressure plates 11. In all the above cases, a current carrying electrical power connection can also be made to one or more intermediate pressure plates 12. In case (a), an even number of intermediate pressure plates 12 is used (if intermediate pressure plates are used, then at least two are required); in cases (b) and (c), an odd number of intermediate pressure plates 12 is used (at least one intermediate pressure plate is required). In all cases, the intermediate pressure plates 12 preferably divide the total number of cells into sections of equal numbers of cells, and furthermore, alternating negative and positive electrical power connections to the intermediate pressure plates 12 are located such that negative and positive electrical power connections alternate over the length of the electrolyser module 1. In case (a), the current supplied through the positive electrical connection to one of the end pressure plates 11 is half that supplied through the positive electrical connections to intermediate pressure plates 12.

Examples of electrical power connection configurations are depicted schematically in FIGS. 4(*i*) to 4(*iv*): (i) negative electrical power connection to one end pressure plate 11*a* and positive electrical power connection to the other end pressure plate 11*b* of the PEM water electrolyser module 1; (ii) negative electrical power connection to one end pressure plate 11*a* and positive electrical power connection to the other end pressure plate 11*b*, with a non-current carrying electrical ground connection to an intermediate pressure plate 12 at the midpoint of the PEM water electrolyser module 1; (iii) negative electrical power connections to the end pressure plates 11*a* and 11*b*, and positive electrical power connection to an intermediate pressure plate 12 at the midpoint of PEM water electrolyser module 1; and, (iv) positive electrical power connections to the end pressure plates 11*a* and 11*b*, and negative electrical power connection to an intermediate plate 12 at the midpoint of the PEM water electrolyser module 1.

The use of electrical power connections to multiple intermediate pressure plates 12 in the same electrolyser module essentially splits the PEM water electrolyser module into two or more parallel (or separate) sets of electrical power connections; for example, the configurations illustrated in FIG. 4 (*iii*) to (*vi*). Potential advantages of configurations (v) and (vi) include lower stray current driving forces and availability of more potential external piping connection points. As depicted in FIG. 4 (*i*) to (*vi*), the negative electrical power connections can be connected to the same electrical ground. One or more power supplies (AC to DC converters and/or DC to DC converters) can be used to supply DC electricity to a PEM water electrolyser module via the electrical power connection configurations described above.

External piping connections generally are made to the negative or grounded intermediate pressure plate(s) 12 or the end plates 11. Illustrative examples of such external piping include: (a) the oxygen degassing chamber and the hydrogen gas collection manifold each have one or more gas outlets, which are located in one or more intermediate pressure plates, or in one or both end pressure plates; (b) the oxygen degassing chamber can contain one or more sets of cooling coils or cooling tubes, which are connected to one or more external coolant circulation loops through one or more intermediate pressure plates, or through one or both end pressure plates; (c) the oxygen degassing chamber can contain means of adding feed water, which are connected to one or more intermediate pressure plates, or one or both end pressure plates; and, (d) sensors (for level, temperature, pressure, or other measurements) or sensor reservoirs are connected to the oxygen degassing chamber or to the hydrogen gas collection manifold through one or more intermediate pressure plates, or through one or both end pressure plates.

Figure 5:
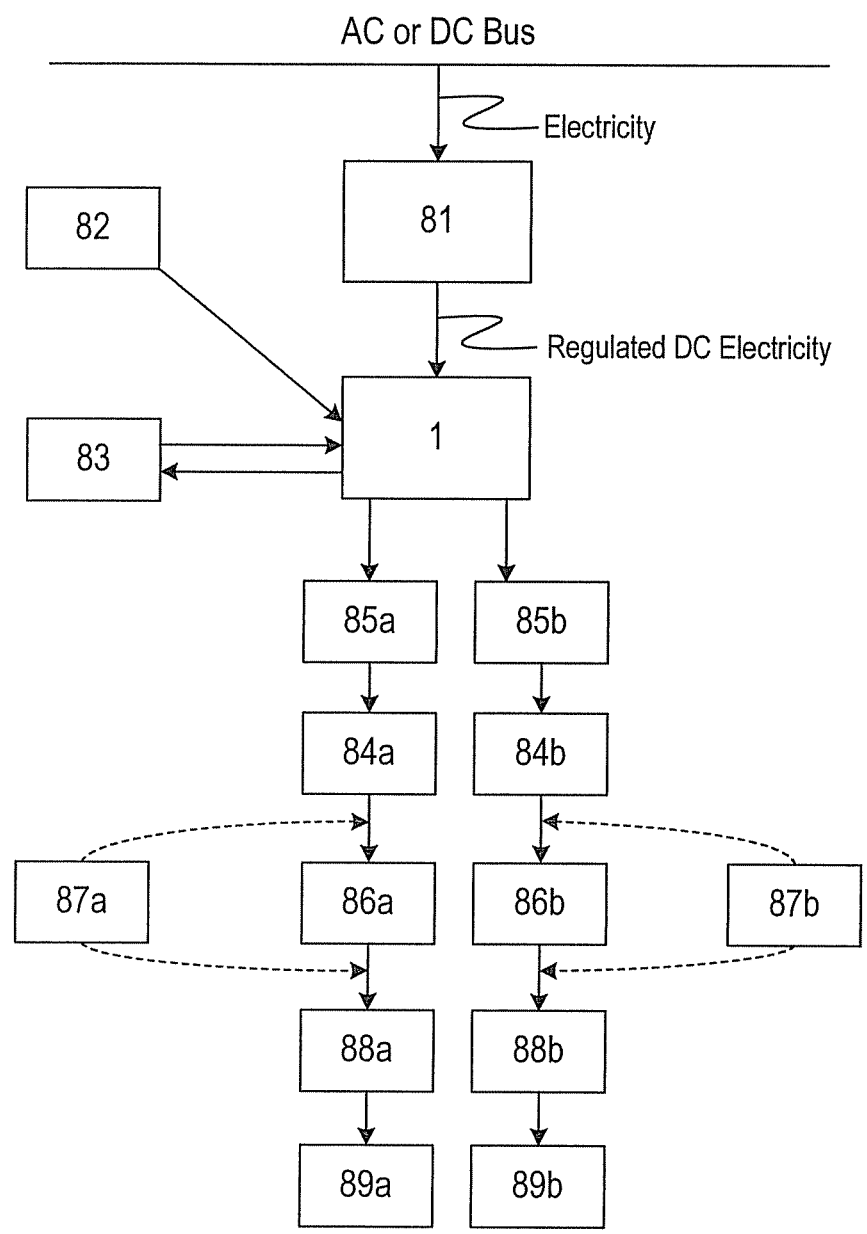

FIG. 5 shows a schematic diagram of an electrolyser system according to the current invention. The PEM water electrolyser module 1 is electrically connected to a source of electricity (electric power) according to any of the general electrical connection configurations described herein. The electricity supplied generally is DC electricity from a power supply 81, which can be, for example, a DC-DC converter to provide regulated DC electricity from a DC bus, or an AC-DC converter to provide regulated DC electricity from an AC bus; the primary electricity source can be an electricity grid, and/or other sources, such as a wind turbine or wind farm, or solar array or solar farm, optionally including some or all of equipment for intermediate processes such as electricity transmission, transformation, and "unregulated" rectification. The PEM water electrolyser module 1 is also connected to a feed water source 82, typically with intermediate feed water purification, e.g., by reverse osmosis and/or ion exchange units. Optionally, a bleed stream of water can be taken from the water inside the PEM water electrolyser module 1 to help maintain acceptable water purity if/as required. The PEM water electrolyser module 1 is further connected to a coolant source 83, which may comprise a coolant reservoir with a chiller or other means of heat removal, as well as coolant circulation and flow rate control means.

The hydrogen gas outlet may be connected to a buffer volume 84*a* at the desired pressure for any downstream application or storage; a similar buffer volume 84*b* also can be used for the oxygen gas outlet. Such buffer volumes can be useful for enabling continuous flow of gases from the electrolyser module 1 at varying flow rates.

Optionally, demisting means 85*a* and 85*b*, as known in the art, can be used to remove mist from the hydrogen gas, and also preferably from the oxygen gas, respectively. The demisting means can be located at any point between the respective gas outlets from PEM water electrolyser module 1 and buffer volumes 84*a* and 84*b*. Further, the oxygen gas demisting means can be integrated into the degassing chamber.

The electrolyser system may further comprise gas conditioning (gas purification) means for hydrogen 86*a*, and/or oxygen, 86*b*, which may comprise, e.g., catalytic purifiers and driers. Hydrogen compression means 87*a* and/or oxygen compression means 87*b* may be included according to downstream pressure requirements, and can be located either upstream or downstream of the gas conditioning means 86*a* and/or 86*b*, depending on the pressure of the gas produced by PEM water electrolyser module 1. Hydrogen transmission and/or storage means 88*a* and/or oxygen storage means 88*b* can optionally be included if there is a need to store excess hydrogen and/or oxygen for future use. Users 89*a* and 89*b* can be the same entity, and can include, for example, industrial processes using hydrogen and/or oxygen, hydrogen fuel dispensing systems for hydrogen-powered vehicles, or electricity generators.

The inherently scalable PEM water electrolyser module generally produces hydrogen gas and oxygen gas by first generating the hydrogen gas and oxygen gas in the plurality of electrolytic cells contained in the electrolyser module. The hydrogen gas is transferred directly from the top part of each cathode half cell chamber to one or more hydrogen gas collection manifolds that are integrally contained in the electrolyser module structure, through hydrogen gas passages. The hydrogen gas is removed from the top part of the one or more hydrogen gas collection manifolds.

Simultaneously, the oxygen gas-electrolyte mixtures are transferred directly from the top part of each anode half cell chamber to the bottom part of the upper section of one or more oxygen degassing chambers that are integrally contained in the electrolyser module structure, through respective gas-liquid transfer passages extending directly from each anode half cell chamber to the one or more oxygen degassing chambers. The oxygen gas-liquid water mixture streams also carry heat from each of the anode half cells, and are directed longitudinally along the length of the one or more oxygen degassing chambers, in order to promote heat transfer to the cooling coils or cooling tubes. The oxygen gas is separated from the liquid water in the one or more oxygen degassing chambers to produce oxygen gas and degassed liquid water. The resulting oxygen gas is removed from the top part of the one or more oxygen degassing chambers, and the degassed liquid water is cooled by the cooling coils or tubes and transferred directly from the bottom part of the lower section of the one or more oxygen degassing chambers to the bottom part of the anode half cell chamber through degassed liquid passages directly connecting the one or more oxygen degassing chambers to each anode half cell chamber. The re-circulating degassed and cooled liquid water serves to cool each cell in the PEM water electrolyser module 1.

The contemplated operating pressure of the electrolyser module according to the present invention lies between atmospheric pressure and 30 barg or possibly higher, depending on the application requirements and the pressure holding capability of the electrolyser module structure. Note that the hydrogen (cathode) side and the oxygen (anode) side of the PEM water electrolyser module 1 can be at different operating pressures. In order to maintain inherent scalability of the electrolyser module, no additional pressure containment means, such as a pressure vessel surrounding the electrolyser module, or load bearing reinforcing support or shell/sleeve is utilized. Reinforcement of each structural plate can be considered to maintain inherent scalability of the electrolyser module.

An advantage of the current invention for operation of the PEM water electrolyser module is that the hydrogen side pressure and oxygen side pressure can be different or substantially the same during operation. Operating the hydrogen side and oxygen side at substantially the same pressure allows operation without differential pressure across the MEA's, and reduces stress on them, benefiting MEA durability, and also enabling the use of thinner membranes (thereby improving cell performance, which reduces power consumption, improves operational flexibility and reduces cooling requirements) even with pressurized hydrogen production at large scale. Alternatively, a differential pressure of up to about 300 psi can be maintained between the hydrogen side and the oxygen side of the PEM water electrolyser module, but since the oxygen side can be operated at significantly elevated pressure, e.g., 150 psi, the range of potential hydrogen side pressures is extended, allowing the hydrogen side to be operated at up to, e.g., 450 psi. It is to be understood that the differential pressure between the hydrogen side and the oxygen side can be maintained at any suitable value up to the maximum supportable by the MEA's and their reinforcing hardware.

It is preferable to start operation of the electrolyser module at the intended operating pressure(s), especially on the oxygen side, in order to avoid difficulties with larger gas volumes at lower pressures. Thus, the interior pressure of the electrolyser module is increased to the intended operating pressure(s) prior to initial start up by introducing pressurized inert gas into the electrolyser module. The term initial start up is understood to include any start up after depressurization of the electrolyser module is required. Examples of suitable inert gases are nitrogen, argon and helium. Once the electrolyser module is pressurized with inert gas, operation of the electrolyser module can be started; the product gas is vented until the gas purity reaches acceptable levels, which will depend on the user application.

EXAMPLE 1

The fluid flows on the oxygen side of a six-cell PEM water electrolyser module according to the present invention were modeled by computational fluid dynamics (CFD). The general structural plate configuration was as shown in FIG. 3. The cell active area was 6,000 cm$^2$. The hydrogen gas-liquid separation chamber was comprised of an upper section 30 cm×56.3 cm×13.2 cm. The cross sectional area of the gas-liquid passages and the degassed liquid passages was 3 cm$^2$. The maximum current density investigated was 3,000 mA/cm$^2$. This corresponds to a hydrogen generation rate per cathode half cell of 7.5 Nm$^3$/h. Simulations for current densities from 100 mA/cm$^2$ to 3,000 mA/cm$^2$ showed: (a) good oxygen gas-liquid separation efficiency, with negligible oxygen gas carry under to the half cell chamber; (b) high liquid circulation rates; and, (c) low void fractions at the top of the anode half cell chamber. The liquid circulation rates and void fractions for each of the six anode half cells were within 0.5% and 3.0% of each other at 2,000 mA/cm$^2$ and 100 mA/cm$^2$, respectively, which is indicative of inherent scalability.

EXAMPLE 2

Next, the number of cells in the PEM water electrolyser module of Example 1 was increased to 50 cells. The fluid flows in the 50-cell electrolyser module were modeled by CFD. For simplicity, the fluid flows on the oxygen (anodes) side only are described herein. The results for each half cell were similar to those obtained for half cells in the six-cell electrolyser module, demonstrating the inherent scalability of the design. For example, fluid flow rates in any of the degassed liquid passages in the 50-cell electrolyser module were within 1% of fluid flow rates in any of the degassed liquid passages in the six-cell electrolyser module. Furthermore: (i) fluid flow rates in degassed liquid passages were higher in the 50-cell electrolyser module than in the six-cell electrolyser module, and (ii) the fluid flow rates in the degassed liquid passages for each of the 50 anode half cells were within 1% of each other. Similarly, void fractions at the tops of the 50 anode half cell chambers were almost equal, and also were within 1% of the void fractions at the tops of any of the anode half cell chambers in the six-cell electrolyser module.

EXAMPLE 3

Next, the number of cells in the PEM water electrolyser module of Example 2 was increased to 200 cells. The fluid flows in the 200-cell electrolyser module were modeled by CFD. For simplicity, the fluid flows on the oxygen (anodes) side only are described herein. The results for each half cell were similar to those obtained for half cells in six-cell and 50-cell electrolyser modules, demonstrating the inherent scalability of the design. For example, the range of fluid flow rates in the degassed liquid passages in the 200-cell electrolyser module was identical to the range of fluid flow rates in the degassed liquid passages in the 50-cell electrolyser module. Similarly, void fractions at the tops of the 200 anode half cell chambers were almost equal, and also were almost equal to the void fractions at the tops of the anode half cell chambers in the 50-cell electrolyser module.

EXAMPLE 4

Next, the effect of using a rectangular (versus circular) cell area was investigated for a six-cell PEM water electrolyser module. The general structural plate configuration was as in FIG. 3, except the cell area was rectangular instead of circular. The cell active area was 6,000 cm$^2$ (690 cm×870 cm). Simulations for 2,000 mA/cm$^2$ showed: (a) good oxygen gas-liquid separation efficiency, with negligible oxygen gas carry under to the half cell chamber; (b) high liquid circulation rates; and, (c) low void fractions at the top of the anode half cell chamber. The liquid circulation rates and void fractions at the top of the anode half cell chambers were uniform along the length of the electrolyser module.

It is contemplated that the PEM water electrolyser module of the present invention be used for large scale (e.g., MW scale), high pressure applications.

The foregoing description of the preferred embodiments and examples of the apparatus and process of the invention have been presented to illustrate the principles of the invention and not to limit the invention to the particular embodiments illustrated. It is intended that the scope of the invention be defined by all of the embodiments encompassed within the claims and/or their equivalents.

What is claimed is:

1. A PEM water electrolyser module comprising:
    a plurality of structural plates each having a sidewall extending between opposite end faces with a half cell chamber opening, at least one oxygen degassing chamber opening, and at least one hydrogen gas collection manifold opening, extending through said structural plate between said opposite end faces;
    said structural plates being arranged in face to face juxtaposition between opposite end plates;
    each said half cell chamber opening at least partially housing electrolytic half cell components comprising at least a MEA, a bipolar plate in electrical communication with said MEA, said structural plates and half cell components defining an array of series connected electrolytic cells surmounted by at least one oxygen degassing chamber, and at least one hydrogen gas collection manifold;
    said structural plates defining, at least when in said face to face juxtaposition, respective gas-liquid passages extending between a top part of the anode half cell chambers and a bottom part of an upper section of at least one of said at least one oxygen degassing chamber to provide fluid communication between said anode half cell chambers and said at least one of said at least one oxygen degassing chamber;
    said structural plates further defining, at least when in said face to face juxtaposition, discrete degassed liquid passages extending between a bottom part of a lower section of said at least one oxygen degassing chamber and a bottom part of said anode half cell chambers for degassed liquid return from at least one of said at least one oxygen degassing chamber to said anode half cell chambers;
    said structural plates further defining, at least when in face to face juxtaposition hydrogen gas passages extending between a top part of the cathode half cell chambers and at least one of said at least one gas collection manifold to provide fluid communication between said cathode half cell chambers and at least one of said at least one gas collection manifold;
    said PEM water electrolyser module further comprising oxygen gas discharge and feed water passages extending therethrough and fluidly communicating with said degassing chamber for oxygen gas discharge from said at least one oxygen degassing chamber and for feed water introduction into said degassing chamber;
    said PEM water electrolyser module further comprising hydrogen gas passages extending therethrough for hydrogen gas discharge from said at least one hydrogen gas collection manifold; and
    said PEM water electrolyser module further comprising at least one of cooling tubes and cooling coils contained in said at least one oxygen degassing chamber for cooling incoming gas-liquid mixtures.

2. A PEM water electrolyser module as claimed in claim 1 further comprising at least one intermediate pressure plate interspersed between said structural plates along a length of said PEM water electrolyser module; each said at least one intermediate pressure plate comprising opposite end faces with a sidewall extending between said opposite end faces, said intermediate pressure plate defining at least one oxygen-water degassing chamber opening and at least one through hole extending between said opposite end faces, and at least one hydrogen gas collection manifold opening extending between its opposite end faces for registering with said at least one oxygen degassing chamber and said at least one hydrogen gas collection manifold, respectively, for receiving oxygen gas and hydrogen gas, respectively, therefrom.

3. A PEM water electrolyser module according to claim 1 or 2, wherein at least a portion of said gas-liquid, degassed liquid, and hydrogen gas passages are partially defined by channels extending into at least one of said opposite end faces of said structural plates.

4. A PEM water electrolyser module as claimed in claim 3 wherein said passages are defined by surface channels extending into at least some of said opposite end faces of said structural plates in conjunction with the adjacent of said opposite end faces of said structural plates.

5. A PEM water electrolyser module according to claim 1 or 2, wherein said degassing chamber opening further comprises a fluid flow directing means over the point of connection of said gas-liquid passages to said degassing chamber opening.

6. A PEM water electrolyser module according to claim 1 or 2, further comprising holding features in said structural plates around the periphery of said half cell chamber opening for locating and holding said electrolytic half cell components.

7. A PEM water electrolyser module according to claim 1 or 2 further comprising holding features in at least said structural plates for locating and holding sealing gaskets.

8. A PEM water electrolyser module according to claim 1 or 2 wherein said structural plates are comprised of plastic.

* * * * *